April 19, 1966  C. D. FISHER  3,246,594
MANUFACTURE OF COOKED OR EXPANDED AND EXTRUDED PELLETS
Filed Sept. 28, 1960  5 Sheets-Sheet 3

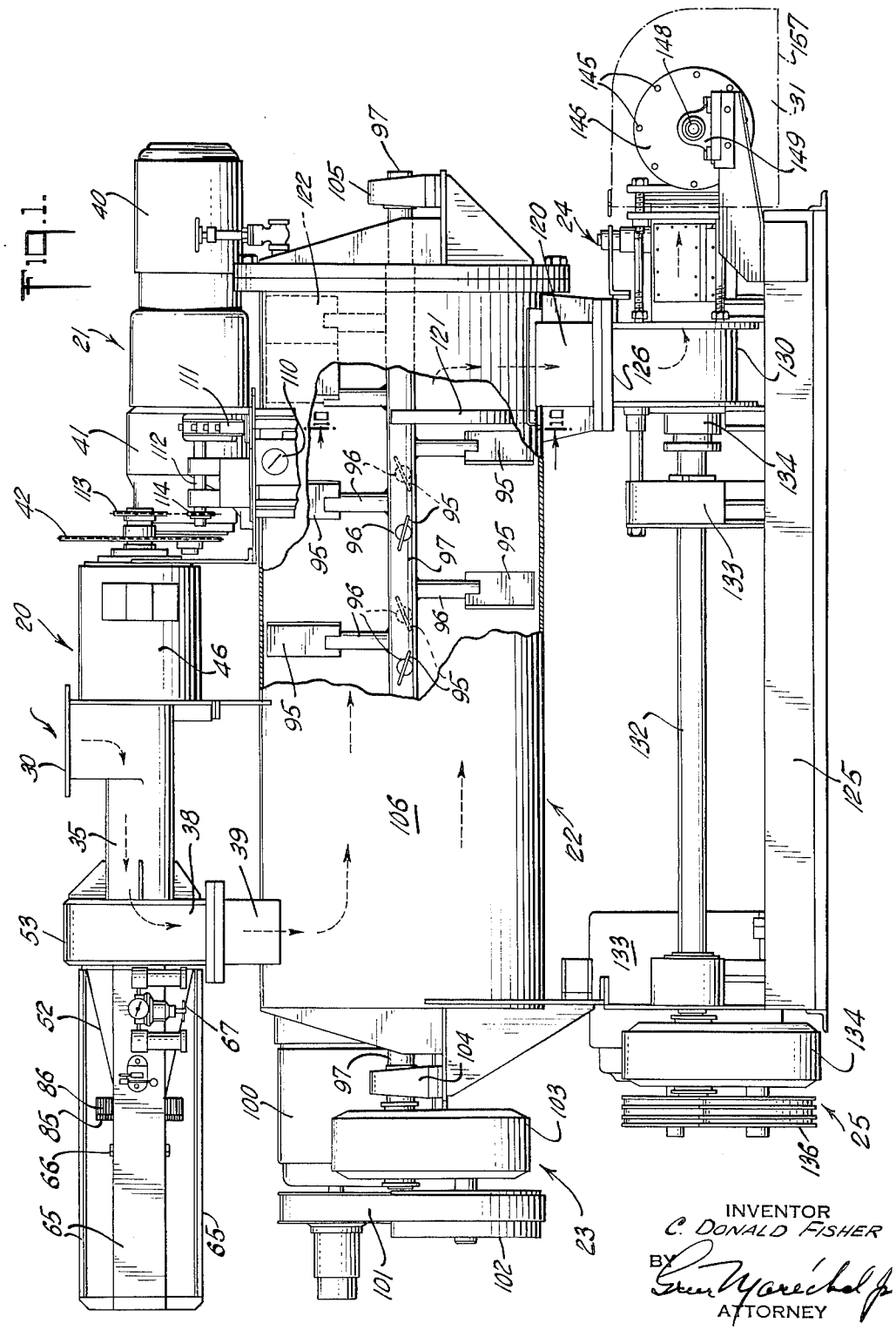

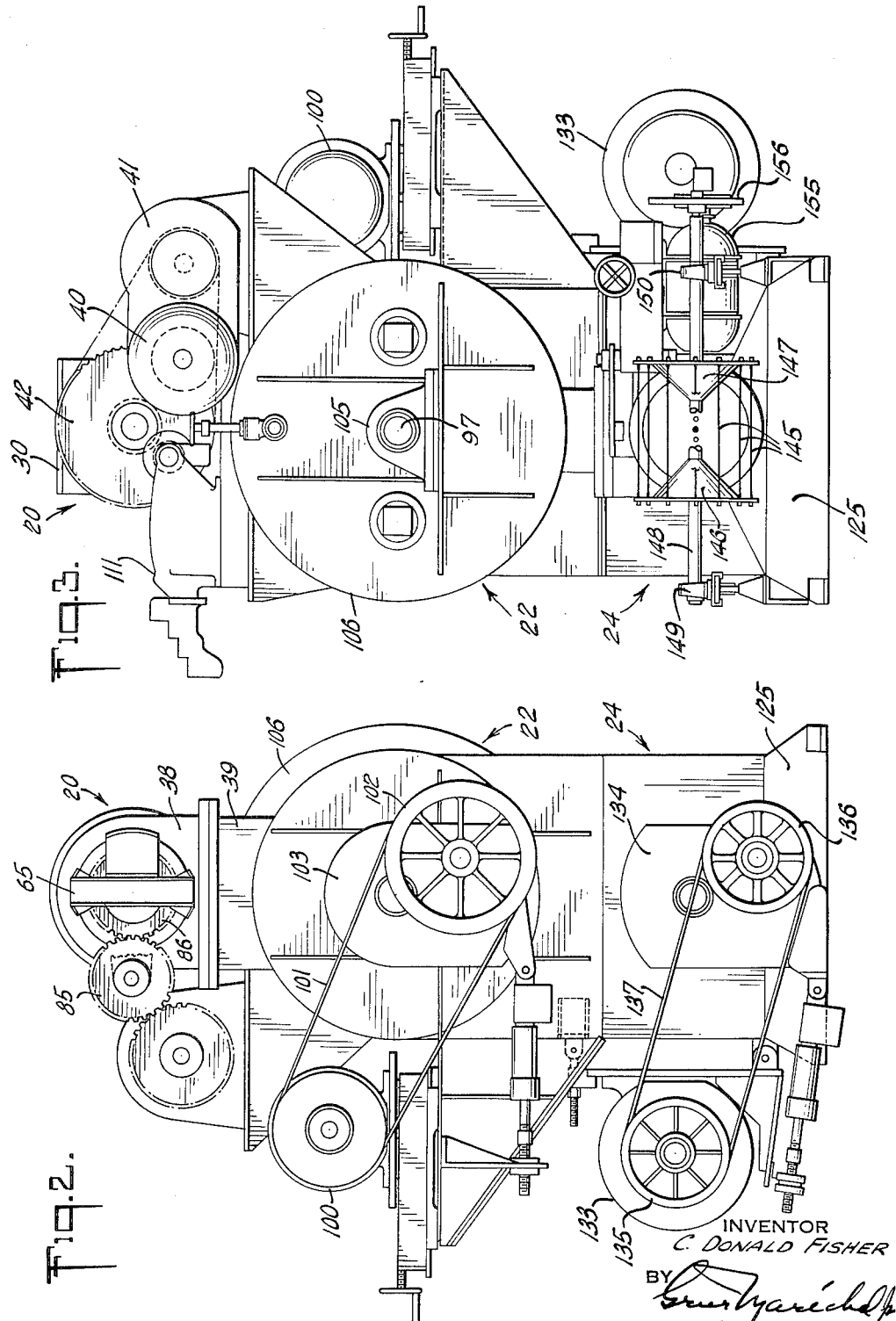

INVENTOR
C. DONALD FISHER
ATTORNEY

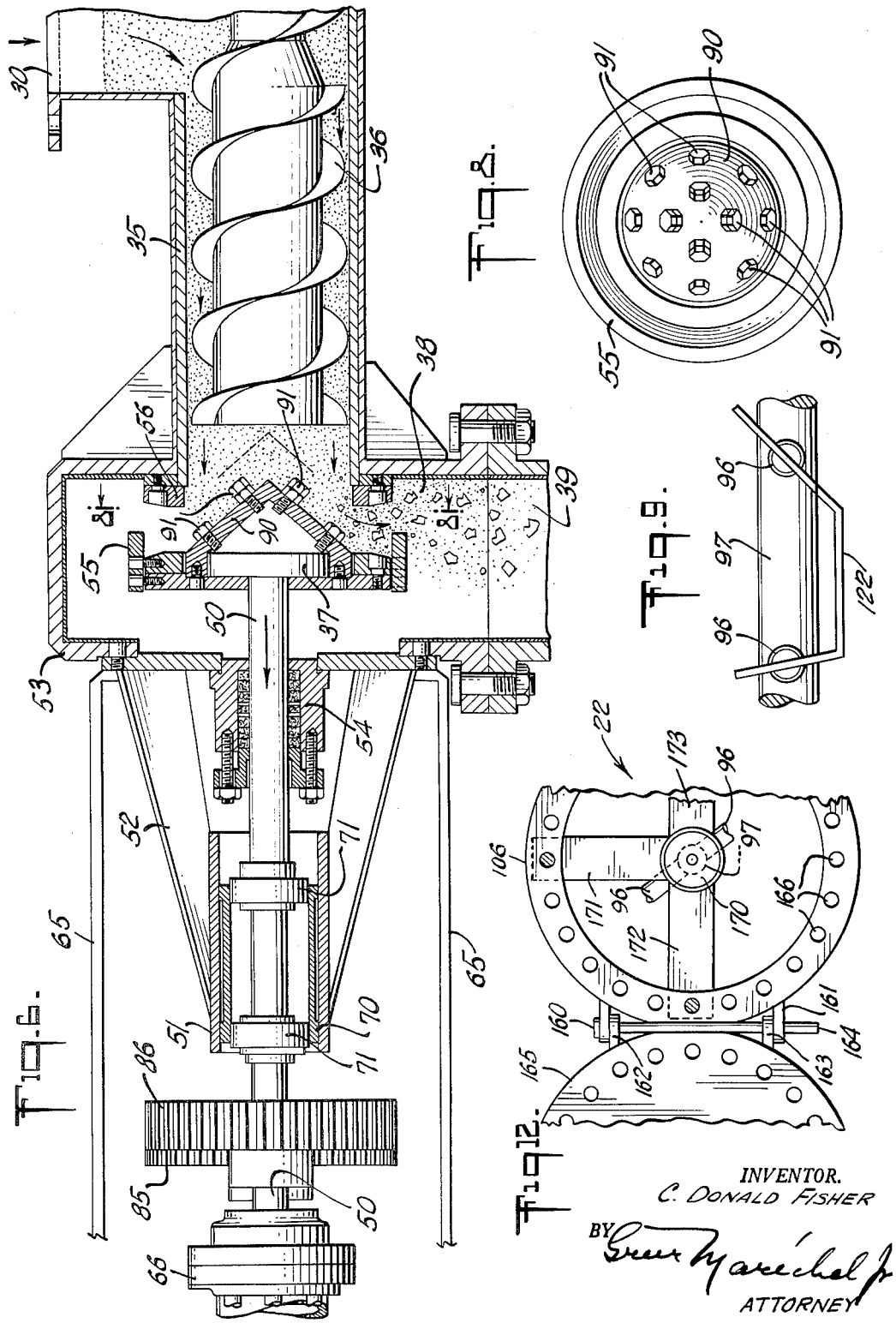

April 19, 1966  C. D. FISHER  3,246,594
MANUFACTURE OF COOKED OR EXPANDED AND EXTRUDED PELLETS
Filed Sept. 28, 1960  5 Sheets-Sheet 5
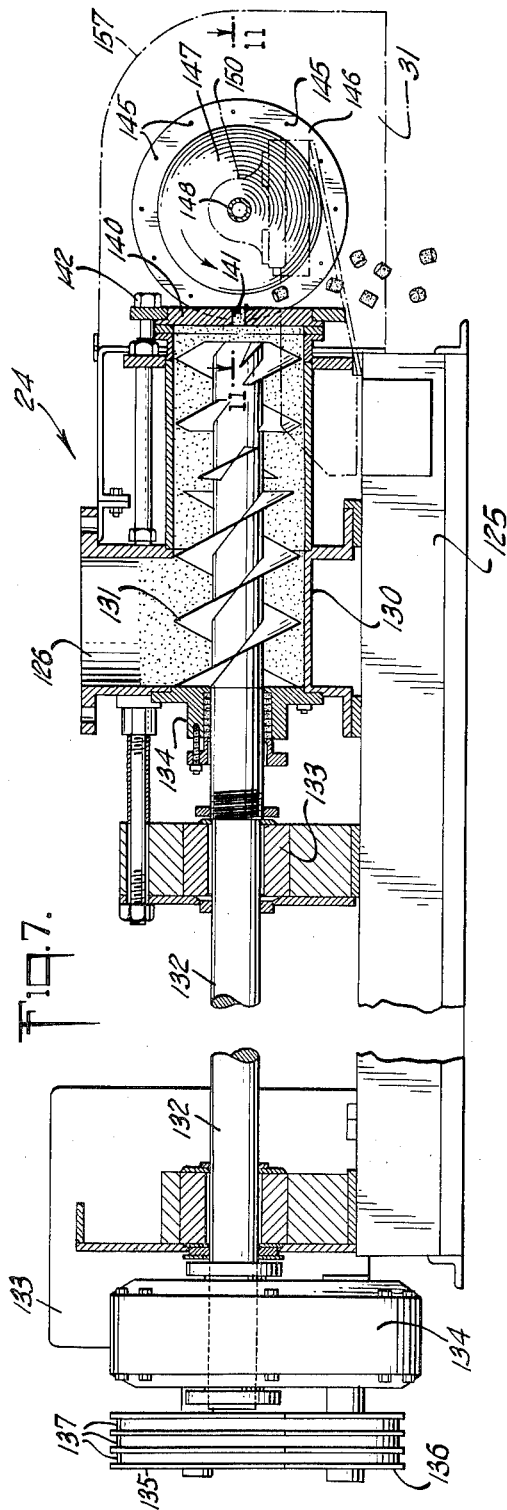
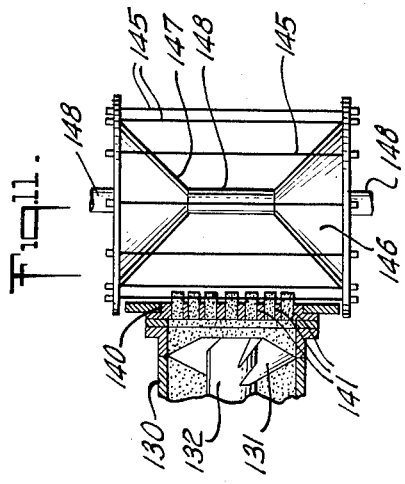
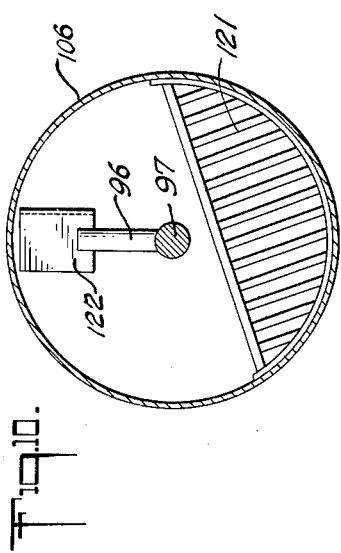
INVENTOR.
C. DONALD FISHER
BY
ATTORNEY

United States Patent Office 3,246,594
Patented Apr. 19, 1966

3,246,594
MANUFACTURE OF COOKED OR EXPANDED
AND EXTRUDED PELLETS
C. Donald Fisher, Muncy, Pa., assignor to Sprout Waldron & Company Inc., Muncy, Pa., a corporation of Pennsylvania
Filed Sept. 28, 1960, Ser. No. 59,047
6 Claims. (Cl. 99—238)

This invention relates to the manufacture of pellets from a cooked mash of cereal or other materials to be pelleted and, more particularly, to the production of cooked or expanded and extruded pellets from cereal and starchy products and the like in a continuous operation integrating feeding and cooking and pelleting steps and with the cooking or conditioning step being carried out under conditions of temperature and super-atmospheric pressure whereby expansion of the pellets upon formation is effected if desired.

In the manufacture of prepared feeds, and particularly prepared feed pellets or biscuits for animals (or human consumption) from cereals, grains, grasses, and other starchy plant foods, it may be desired to subject the starchy or carbohydrate content of the cereal or starchy grain material to a cooking or hydrating or gelatinizing process or operation in order to convert the starchy material into a form from which the nutrient value may be more readily assimilated or utilized. Also it may be desired, in addition to subjecting the feed to a cooking operation, to compose a mash of a number of different cereal or grain or other ingredients to be formed or extruded into dried pellets or biscuits for enhancing the ease of handling of the finished product, and/or also to have the dried pellets assume an expanded nature to achieve less density or greater bulk or to include internal porosity or interstices as for the enhanced absorption of fluids, etc.

Particularly with regard to the continuous subjecting of various cereal or grain or other feed materials to cooking and compounding into the desired feed pellets or biscuits, if it is desired to effect such cooking step as by subjecting the material to the action of steam under pressure in a continuous feeding step, it may be desired to provide apparatus for feeding the dry ingredients of the finished product into a steaming or pressure cooking vessel without permitting the escape of steam or pressure therefrom, and withdrawing the cooked or processed mash from such pressure cooking vessel without permitting escape of pressure therefrom and, desirably, in the form of extruded pellets or biscuits which, according to the conditions imposed thereon, may be expanded to a less dense form as may be desired.

According to this invention, then, there is provided means and methods for the processing, in a continuous manner if desired, of a dry meal or mixture of cereal or grain or other feed components, and the like, and feeding the dry meal or mixture into and through a steam pressure cooking and treating or conditioning vessel for processing or cooking or mixing the dry ingredients into a cooked or damp and/or otherwise extrudable mash, extruding the cooked mash after a predetermined treating time or cycle into the desired pellets or biscuits, with expansion thereof if desired, as extruded into atmospheric pressure from the pressure cooking vessel or zone.

One object of this invention is to provide for the pressure cooking of dry ingredients into an extrudable or pelletable mash, in a continuous manner, and continuously to form such cooked mash into a plurality of pellets or biscuits.

Another object of this invention is to provide continuous feeding and cooking and extruding or conditioning mechanism for receiving a dry cereal or like meal or other material, feeding it into a pressure cooking vessel against the pressure therein, treating and pressure cooking or digesting the material so fed to prepare a cooked and/or pelletable mash, and extruding the mash into pellets or biscuits.

A further object of this invention is to provide a continuous feeder-cooker-extruder apparatus of the character described for continuously feeding a dry granular material into a pressurized cooking zone therein for treatment of the material continuously with steam pressure, and for the extrusion discharging of cooked material in the form of pellets from such a pressurized cooking zone, both the feeding and the discharging mechanism being arranged to retain within the cooking zone substantial super-atmospheric pressure therein despite continuous operation thereof.

A still further object of this invention is to provide for continuously cooking in an atmosphere of water and steam pressure a dry material into a pelletable mash and then extruding such cooked mash from the cooking operation to form pellets or biscuits thereof and under such circumstances that a flash expansion of the cooking steam or pressure occurs upon extrusion of the mass to provide a pellet of substantially expanded and less density than that of the pressure cooked mash.

Still another object of this invention is to provide, in apparatus of the character described, feeding mechanism for feeding a dry granular or pulverous material into a pressure vessel maintained at a substantial super-atmospheric pressure, whereby the feeding mechanism builds up a pressure-resistant plug of compacted dry material and includes means for breaking off the internal end of such compacted plug to provide the feeding of said dry material while maintaining such plug to resist escape of pressure from the pressure vessel.

A still further object of this invention is to provide, in apparatus of the character described, an arrangement for receiving a damp cooked pelletable mash under pressure and for extruding it through pelleting orifices while maintaining a pressure-resistant plug or layer of the mash on the inside of the extrusion orifice or for retaining pressure within the vessel.

Still another object of this invention is to provide, in apparatus of the character described, an arrangement for receiving a damp cooked pelletable mash under pressure and for extruding it through pelleting orifices while maintaining a pressure-resistant plug or layer or the mash on the inside of the extrusion orifice for retaining pressure within the vessel, and including means outside the extrusion orifice for periodically cutting into the length desired material extruded through the extrusion or discharge orifice.

Other objects and advantages of this invention will be apparent from the following description, the accompanying drawings, and the appended claims.

In the drawings:

FIG. 1 is a side elevation, partly broken away, of a form of apparatus embodying and for practicing this invention;

FIG. 2 is an end elevation from the left of FIG. 1;

FIG. 3 is an end elevation from the right of FIG. 1;

FIG. 6 is a partial vertical section on a somewhat larger scale and of FIG. 5 with various of the parts in a different position, as in the course of operation;

FIG. 7 is a partial vertical section of the discharge and extrusion apparatus of FIG. 1;

FIG. 8 is a view in elevation taken along the line 8—8 of FIG. 6;

FIG. 9 is a detailed view on a somewhat larger scale of the final paddle member of the cooking vessel of FIG. 1;

FIG. 10 is a view on a somewhat larger scale along the line 10—10 of FIG. 1;

FIG. 11 is a view in partial section and partial elevation along the line 11—11 of FIG. 7; and FIG. 12 is a partial end elevation similar to FIG. 4 and showing a modification of the end closure and bearing assembly thereof.

Figure 4:
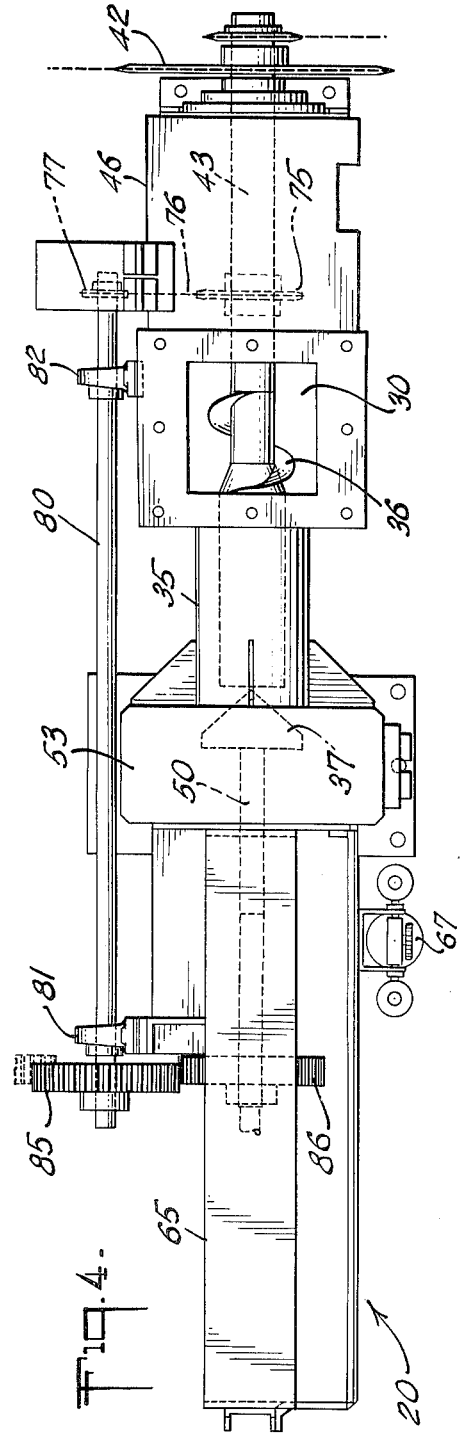
FIG. 4 is a partial top plan view of the feeding mechanism of FIG. 1.

Referring to the drawings, which illustrate apparatus embodying and for practicing this invention and in which like characters of reference refer to like parts throughout the several views thereof, it will be noted that the illustrated apparatus, generally, includes a feeding apparatus or unit indicated generally at 20 with drive means 21 therefor, a cooking and digesting apparatus or unit indicated generally at 22 with drive means 23 therefor, and an extruding or discharge apparatus or unit indicated generally at 24 with drive means 25 therefor—all for receiving a dry or granular or pulvurent cereal or grain or other material at an inlet 30 in feeder 20, feeding the dry material into pressure cooker 22 without permitting escape of pressure therefrom and to form a cooked damp mash of pelletable material, and then extruding the cooked mash from pressure cooking apparatus 22 through extruder 24, without permitting escape of pressure from cooker 22, to produce pellets as desired out of the final discharge outlet indicated generally at 31.

Figure 5:
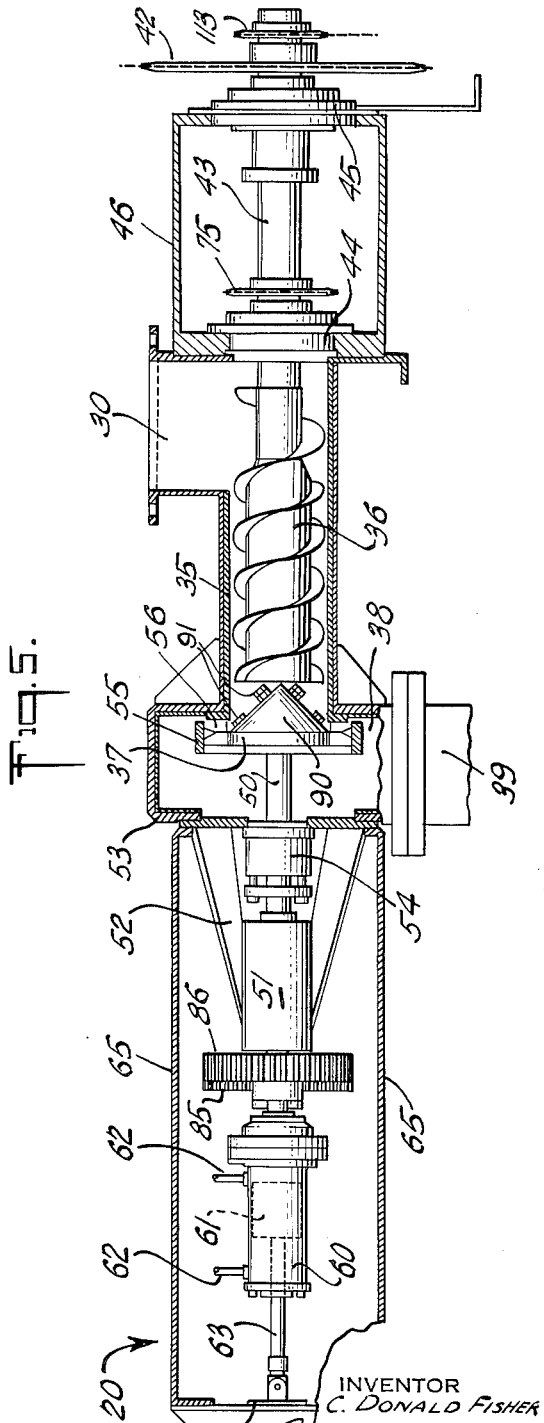
FIG. 5 is a partial vertical section of FIG. 4.

Considering, first, the feeding mechanism 20 for receiving a dry material to be treated through inlet 30 thereof and feeding the same into cooker and conditioning apparatus 22 against pressure therein and while preserving super-atmospheric pressure therein, it will be noted (particularly from the showings of FIGS. 4 and 5) that inlet 30 in feeder 20 is adapted to receive dry or granular material from any convenient source, and communicates with a horizontal cylindrical section 35 in which is positioned a worm or screw conveyor 36 for positively conveying material dropping in inlet 30 toward the left in the drawings through cylindrical section 35. The left-hand end of section 35 (as indicated in FIGS. 4–6) may be closed by an axially movable gate or closure indicated at 37 and described in more detail below. Under the control of gate 37 (in the various axial positions thereof, some of which are indicated, for example, in FIGS. 5 and 6) dry material is fed through cylindrical portion 35 for feeder 20 under the action of screw 36, and is discharged out of the outlet 38 of feeder 20, which communicates directly with the inlet 39 of cooking and conditioning apparatus 22.

As indicated in FIGS. 1–3, the feeding apparatus is powered by a conventional motor and variable speed drive mechanism indicated at 40 and 41, with a driving connection as by the chain-and-sprocket drive 42 to drive shaft 43, suitably journaled, as at 44 and 45 in a casing 46, at the right-hand end of feeder 20, and with worm or screw feeder 36 being mounted on drive shaft 43.

As noted above, and as indicated in more detail in FIGS. 5 and 6, the gate or closure 37 for the left end of horizontal cylindrical section 35 is axially translatable from a closed position (indicated in FIG. 5) in which flow communication is interrupted (for either dry materials or steam pressure) between feeder outlet 38 and feeder inlet 30 in either direction to a plurality of open positions (indicated in FIG. 6) in which dry material is fed through section 35 into inlet 39.

Thus, gate 37 is mounted on an axially movable shaft 50 supported in an axially translating and rotatable journal arrangement 51 on brackets 52 affixed to a portion 53 of the outer casing of feeder 20 and with a suitable packing gland 54 around shaft 50, in known manner, for the retention within casing 53 of super-atmospheric pressure in cooker 22. Preferably, as indicated in the drawings, gate 37 includes an annular ring 55 for interfitting closure cooperation with an annular bushing 56 at the discharge end of cylindrical section 35 so that, when gate 37 is in the closed position thereof (as indicated in FIG. 5) ring 55 cooperates with bushing 56 to prevent escape of super-atmospheric pressure from cooker 22 through the passage 38–39 into horizontal section 35, such sealing arrangement being aided by the effect of such super-atmospheric pressure on the left-hand side of gate 37 tending to force ring 55 and bushing 56 more closely into closed relationship.

The axial movement of rod 50 and gate 37 is effected, in known manner, by the action of a cylinder-and-piston motor arrangement indicated particularly in FIG. 5 as including a cylinder 60 in which operates a piston 61 for axial displacement in accordance with the injection and withdrawal of pressure fluid through conduits 62 on one side or another of piston 61 in cylinder 60.

In the illustrative embodiment shown, piston 61 is mounted on a stationary piston rod 63 affixed at 64 to an extended bracket 65 mounted on casing 53 of feeder 20, and cylinder 60, as by a coupling indicated at 66, is connected to shaft 50, whereby, as will be understood from the foregoing, axial translational movement of shaft 50 and gate 37 is achieved with respect to the cylindrical section 35 of feeder 20 and bushing 56 around the exit end thereof, as cylinder 60 is actually translated with respect to fixed piston 61 under the action of pressure fluid admitted or withdrawn to one or another side of piston 61 and under the control of a pressure reducing valve and gauge assembly indicated at 67, in known manner.

As noted more particularly in FIG. 6, in the illustrated embodiment, shaft 50 is mounted for sliding axial movement within sleeve 51 as by a cylindrical sliding bearing sleeve 70 axially slideable within sleeve 51. As will be noted below, shaft 50 is also mounted for rotation, as well as axial translational movement, and, in the illustrated embodiment, such mounting is achieved by having suitable rotating journals or bearings 71 within sliding sleeve 70 in mounting 51, and, as will be understood, the packing gland indicated at 54 is suitably arranged to accommodate both rotational and axial translational movement of shaft 50 while still retaining within casing 53 any superatmospheric pressure introduced thereinto by virtue of direct communication with the cooking and conditioning apparatus 22 through conduits 38–39.

As noted, in addition to the translational movement of shaft 50 and closure 37 under the action of cylinder-and-piston motor 60–61, shaft 50 and gate or closure 37 is preferably also driven for rotation. In the illustrated embodiment, such drive mechanism for accomplishing rotation of shaft 50 and closure 37 is indicated as including a sprocket 75 mounted on drive shaft 43 to be driven thereby and connected by a chain drive indicated at 76 to a sprocket 77 mounted on a jack shaft 80 suitably journaled, as at brackets 81 and 82, to feeder 20 and extending for a substantial distance therealong to the left of casing 53 thereof into the area of shaft 50 beyond the mounting sleeve 51 thereof.

On the left-hand end of jack shaft 80 is mounted a gear 85 for meshing engagement with a cooperating gear 86 mounted on shaft 50. Thus, as will be understood from the foregoing, rotation of drive shaft 43 by power means 21 provides, through chain-and-sprocket drive 75–77, rotation of jack shaft 80, which, in turn through meshing engagement of gears 85 and 86, provides for rotation of shaft 50 and closure or gate 37 thereon. As indicated in the drawings, the thicknesses and positionings of both gears 85 and 86 are selected, as will be understood, to assure the meshing engagement thereof for at least a sufficient driving portion of the gear faces in various axial positions of shaft 50 and notwithstanding the aforementioned axial translational movement of shaft 50 (and gear 86 thereon) axially with respect to gear 85, so that driving engagement for rotation of shaft 50 and gate 37 thereon is maintained as between gears 85 and 86 for all possible various axial positionings of shaft 50.

In accordance with the foregoing, then, dry or granular material, such as cereal, feed, and like mixtures, is introduced into feeding apparatus 20 through material inlet 30 thereof, and is conveyed toward the left of horizontal section 35 by worm 36. Fluid pressure is maintained in cylinder 60 at the right-hand side of piston 61 therein so as to force shaft 50 and gate 37 to the right in the drawings to the closed position indicated in FIG. 5 to exclude super-atmospheric pressure from flowing out of conduit 38–39 and into horizontal section 35. With continued rotation of screw 36 and continued feeding of dry material thereby against the closed gate 37, a compacted plug of dry material builds up at the left end of screw 36, and, by adjustment of the fluid pressure regulating means for the pressure applied in cylinder 60 in known manner, shaft 50 and gate 37 are maintained in the right-hand or closed position against the compacting action of screw 36 until such time as a compacted plug of dry material is achieved of sufficient compaction to withstand whatever super-atmospheric pressure is in the cooking and conditioning mechanism 22. Then the plug of dry material at the left-hand end of worm 36 is permitted to force gate 37 and shaft 50 to the left of the drawings within casing 53, while still retaining therein the desired super-atmospheric pressure.

It may be that the dry material being forced against gate 37 by the action of screw 36 is so compacted as to be too self-sustaining to crumble, as desired, for gravity feeding through conduit 38–39 into the cooking and conditioning mechanism 22. Hence, in the preferred embodiment illustrated and as noted above, in addition to being axially translatable, gate 37 is also driven for rotation to crumble or wear off the left-hand end of such a plug of granular material for gravity feed (as indicated in FIG. 6) down through conduit 38–39 into the pressure cooking and conditioning unit 22. As an aid to the attrition or crumbling effect desired on the compacted plug of material being fed, the right-hand face of gate 37 is preferably conically configured, as indicated in the drawing, as by having a conical face plate 90 preferably studded with a plurality of projections or abrasion elements, indicated as the bolt heads 91, to provide an enhanced gnawing or crumbling or attrition effect on the end of the compacted plug of the dry material as formed by the action of screw 36 against the closed position resistance of gate 37 to crumble or gnaw away dry material from the left-hand end of such plug to fall by gravity through conduits 38–39 into the pressure cooling unit 22.

The pressure cooking unit 22 is, in the illustrated embodiment, generally comprised of an elongated cylindrical vessel into which dry material for cooking or conditioning or mixing enters through the material inlet 39 from feeder 20 as above described, and through which this material to be processed is gradually mixed together and urged axially to the right in FIG. 1 under the action of a rotating paddle feeder arrangement. Such paddle feeder includes radially extending but axially angled paddles 95 mounted on radially extending arms 96 about a central axially extending and rotating shaft 97. Rotation of this shaft 97 in the illustrated device is accomplished by the drive means indicated at 23 and including a motor 100 driving, as by belt 101 and pulley 102, a conventional reduction gear drive 103 in driving engagement with shaft 97, which is, as will be understood, suitably journaled at 104 and 105 for rotation axially of pressure cooking and conditioning unit 22 and with the provision, in known manner, and having suitable packing means for retaining within the casing 106 of pressure cooking unit 22 the desired super-atomspheric pressure therein.

There is also admitted into casing 106 of pressure cooking unit 22 (as through control indicated at 110 and/or under the action of a pump 111 driven from jack shaft 112 as through chain-and-sprocket drive 113–114 from drive shaft 43 of feeder 20) water or steam or other fluid for admixture with the dry material fed into pressure unit 22 through inlet 39 thereof and/or for the cooking and conditioning of material in unit 22. As will be understood, speed of rotation of the paddle feeder 95–97 (and, indeed, the specific orientation of the axial angles of paddles 95 thereof) will be selected and correlated with the length of casing 106 and with the amount of mixing and/or cooking and/or conditioning desired with any particular material, to achieve the desired holding time and/or mixing time of such material within pressure cooking and conditioning unit 22 in accordance with the pressure desired therein and/or the quantity or rate of admixture of water or other fluid with the material in unit 22 so that, for a desired or predetermined mixing and cooking time, in continuous operation, material admitted into casing 106 of pressure cooker 22 through the material inlet 39 thereof will have axially traversed the entire unit 22 to fall by gravity through the material outlet 120 thereof only after having been subjected to the desired or predetermined extent of agitation, conditioning, cooking, mixing, etc., required to form an extrudable or pelletable damp or cooked mash of material for extruding into pellets in extruder unit 24. As indicated in the illustrated embodiment, it is preferred to provide a weir 121 (see FIGS. 1 and 10) in the lower portion of casing 106 and adjacent but immediately before outlet 120 therefrom, and to provide a configuration of the final paddles operating in casing 106 to the right of weir 121 and immediately adjacent outlet 120 somewhat in the shape of paddles 122 shown in more detail in FIG. 9, whereby final agitation or feeding of the cooked or prepared mash is somewhat expedited and/or plugging or compaction of material in pressure cooking unit 22 is avoided at the point of discharge of the cooked and/or conditioned and mixed material through outlet 120 into the extruder and pelleting unit 24.

As indicated in FIGS. 1–2 and, more particularly, FIG. 7, extruder and discharge mechanism 24 is shown in the illustrated embodiment as being mounted on base 125 and as having a material inlet 126 in direct flow communication with outlet 120 of pressure cooking and conditioning unit 22. Extruder or discharge unit 24 also includes a substantially cylindrical horizontal section 130 having operating therein a screw feeder 131 mounted on a shaft 132, suitably journaled for rotation as at 133 and including a pressure resistant packing gland indicated at 134 for retaining super-atmospheric pressure from pressure cooking unit 22. As noted, drive means generally indicated at 25 are provided, also mounted on base 125, for driving shaft 132 and screw feeder 131 and include, in the illustrated embodiment, a motor 133 driving a conventional gear reducer unit 134 in known manner as by a V-belt drive including pulleys 135 and 136 and belts 137.

The right-hand end of cylindrical casing section 130 of extruder and discharge unit 24 is closed by the plate 140 in which are provided a plurality of extrusion openings or orifices 141 for the extrusion therethrough of mixed and conditioned and/or cooked mash from pressure unit 22. That is, as will be understood from the foregoing, the prepared mash, ready for extruding, drops out of pressure unit 22 through discharge 120 thereof and into extruder unit 24 through inlet 126 thereof, to be received by rotating screw conveyor 131 in cylindrical section 130 and conveyed or urged to the right in the drawings by worm 131 against end plate 140. As a mass of conditioned and relatively damp or soggy mash is formed adjacent the inside surface of end plate 140 in cylindrical section 130 of extruder 24, portions of this mash will be extruded through openings 141 in end plate 140 under the continual forcing action of screw 131, while also maintaining a layer or plug of mash against the inside surface of end plate 141 to retain within the apparatus whatever super-atmospheric pressure conditions may be desired therein, notwithstanding, the continuous extrusion of cooked or conditioned material through openings 141 in plate 140.

As will be understood from the foregoing, extrusion of material through extrusion orifices 141 forms a substantially continuous body of material on the outside or right-hand side of plate 140, which it is desired to cut regularly into pellets of whatever length is desired. As will also be understood from the foregoing, end plate 140 is readily removable and replaceable, as by bolts indicated at 142, so that a plurality of end plates 140, each containing extruding orifices 141 of different diameters, is available readily to change the diameter or cross section of the material extruded therethrough.

Extruding unit 24 also includes, in the illustrated embodiment, a preferred means for cutting the extruded material into pellets of the desired length. Such mechanism, as shown, includes (see particularly FIGS. 3, 7, and 11) a rotating cutting cage comprising a plurality of cutting wires 145 (or knives) mounted between conical hubs 146 and 147 on a rotating shaft 148 suitably journaled as at 149 and 150 on base 125. Shaft 148 is driven for rotation, as by a motor 155 and through suitable drive means, preferably speed-variable, indicated generally at 156, and, if desired, the entire cage structure 145–148 may be covered with a housing indicated by the dot-dash lines at 157 providing a bottom opening for the discharge of finished pellets as at 31.

As will be understood from the foregoing, as material is extruded through the extrusion orifices 141 in end plate 140 under the action of screw 131 and as cage 145–148 is rotated with the cutting wires 145 thereof positioned to pass during rotation adjacent the outer face of end plate 140 in the vicinity of extrusion orifices 141 therein, the material being extruded through orifices 141 in end plate 140 will be successively cut into lengths or pellets by each passage of a cutting wire 145 through the extruded material during rotation of cutting cage 145–148. The particular lengths of the pellets thus cut is readily determinable, as will be understood, by the number and spacing of cutting wires 145 provided and as correlated with the speed of rotation of cutting cage 145–148 along with the rate of which material is extruded through orifices 141 under the action of screw 131, which rate, may, indeed, be primarily controlled or indicated by the desirability of maintaining against the inside surface of plate 140 a pressure-resistant layer or mass of cooked material to avoid loss of pressure from pressure cooker 22 and in accordance with the rate of flow of material through and out of cooker 22 and into and out of extrusion unit 24. Also, as will be understood, other types or modifications of cut-off devices or shapes of the wires or knives 145 are within the contemplation hereof and according to whether the cut portions of extrusions or pellets leaving die 140 are desired to be regular or irregular, etc., and the representation of pellets in FIG. 7 as regular cylinders is not to be understood as more than diagrammatically illustrative.

Although FIGS. 1–11 above referred to illustrate satisfactory apparatus embodying and for practising this invention, it may be desired for convenience in certain installations to include in the cooker unit 22 an openable end arrangement, as indicated in FIG. 12. Thus, instead of having the end of casing 106 (as shown in FIG. 3 and at the right hand end of FIG. 1) closed by a fixed plate and with bearing 105 for shaft 97 mounted outside the casing, the modification shown in FIG. 12 may be desired. That is, instead of a fixed end plate for casing 106, the end flange thereof has mounted thereon hinge ears 160 and 161 for forming with cooperating ears 162 and 163 and pin 164 a hinge mounting for an end plate 165. As will be understood, in closed position, end plate 165 will be bolted to the open end of the casing 106, as indicated by bolt holes 166, to form a pressure-resistant closure. If it is desired, for any reason, to gain access to the interior of casing 106, merely removing the bolts from holes 166 will enable opening of end plate 165, with the hinge support 160–164 permitting swinging of the end plate into open position as indicated in FIG. 12 without having to support the weight thereof manually or with a hoist. With such an arrangement, a bearing 170 is provided for the end of shaft 97, but, instead of being mounted outside casing 106 (as is bearing 105 in FIG. 1), bearing 170 is vertically supported and horizontally spaced within casing 106 as by hanger 171 and cross arms 172 and 173 mounted within casing 106.

Accordingly, as will be understood from the foregoing description of apparatus embodying and for practising this invention, substantially the entire cooking and mixing or conditioning of material to be extruded or pelleted in such apparatus is primarily achieved in the pressure cooker or conditioning or mixer apparatus 22, rather than by heating or working in shear achieved merely by the action of screw 131 forcing material through and out of the extruder unit 24, the force pressure provided by this unit in extruding material through orifices 141 in end plate 140 being preferably controlled merely to discharge the extruded material to the atmosphere as desired and at a rate which permits maintaining a pressure-resistant layer or plug of cooked and conditioned mash on the inside surface of end plate 140.

Nevertheless, maintaining a substantial superatmospheric steam or other pressure and temperature within the closed apparatus provides for having, in the conditioned and cooked material extruded through orifices 141, a substantial moisture or steam or fluid content whereby extrusion of the material through orifices 141 from the heated and superatmospheric conditions within the apparatus to no more than atmospheric pressure produces a flash expansion of steam or moisture contained within the mixed and conditioned extruded material. Thus, a substantial expansion of the extruded mash is effected upon emerging from orifices 141 into atmospheric temperature and pressure conditions, and such flash expansion may also be accomplished with some flash drying of the material to aid in having the extruded mass hold the expanded form produced against collapsing before complete drying may be achieved.

As will be understood, the extent of such expansion will depend on many factors such as the original size of the particles being processed, the extent of the cookable starch therein, the extent of cooking of the starch, etc., but this combination of factors, particularly as individually or collectively controlled in accordance herewith, permits the cooking of cereal or grain or other components under heat and pressure into an extrudable mash and then the extrusion thereof with expansion of the extruded material to a greater porosity and less density than as compacted against the inside of die plate 140. It appears, thus, that as will be understood, starch cells in grain or cereal materials are softened or gelatinized during the cooking, which can be controlled to a point where such softening permits the flash expansion, if desired, of the extruded material to provide in the finished pellets or extruded material substantially less density and/or internal air bubbles or interstice or inherent porosity as may be desired after the material is finally dried or hardened, to aid substantially in absorption of liquid when used as in feeding of animals, or to provide a dried and extruded mass of substantially less bulk density than that of either the starting material or the compacted cooked and conditioned extruded mixture, or a less dense and less hard finished product than might be obtained by conventional pressure extrusion without expansion. These several advantages, also, are all obtained in addition to cooking or softening the material with heat and pressure, and are predetermined and controlled for various starting materials, as will be understood from the foregoing discussion, by the temperature and pressure conditions maintained within the disclosed apparatus and as correlated with such factors such as rate of extrusion of the material through orifices 141, size of the orifices, and like considerations.

While the methods and apparatus herein described constitute preferred embodiments of the invention, it is to be understood that the invention is not limited to these precise methods and apparatus and the changes may be made therein without departing from the scope of the invention which is defined in the appended claims.

What is claimed is:

1. In apparatus for continuous pressure cooking of cereal materials and the like into an extrudable mash and for the continuous extrusion thereof to form a plurality of expanded pellets of the character described, the combination which comprises a cooking container for cooking and mixing and conditioning of said cereal materials therein, means for continuously urging said materials through said cooking container, means for supplying heat and super-atmospheric pressure into said cooking container, feeding means for receiving said materials to be cooked and for feeding thereof into said container continuously against superatmospheric pressure therein and including means for compacting said materials into a pressure-resistant plug to resist escape of pressure from said cooking container, rotating means rotating counter to said feeding means for breaking said materials from the inner end of said plug for the feeding thereof into said cooking container, a pressure extrusion assembly in flow communication with said cooking container for receiving therefrom said materials after said cooking while forming a barrier for maintaining said superatmospheric pressure therein and effecting extrusion of said cooked material into atmospheric pressure for expansion of said cooked material upon emergence from said apparatus, and means for sequentially cutting said extruded material into said expanded pellets.

2. In apparatus for the continuous pressure cooking of cereal materials and the like into an extrudable mash and for the continuous extrusion thereof to form a plurality of expanded pellets of the character described, the combination which comprises a cooking container for said pressure cooking of said cereal materials therein at elevated temperatures and under superatmospheric pressure, means for continuously urging said materials through said cooking container, pressure-resistant feeding means for receiving and materials to be cooked and for feeding thereof into said pressurized cooking container continuously against said superatmospheric pressure therein, said feeding means including means for compacting said materials into a pressure-resistant plug to resist escape of superatmospheric pressure from said cooking container and rotational means rotating counter to said feeding means for breaking said materials from the inner end of said plug for the feeding thereof into said cooking container, means for heating said cooking container to said elevated temperature and for maintaining therein continuously said superatmospheric pressure, a pressure extrusion assembly in flow communication with said cooking container for receiving therefrom said materials after said cooking therein while forming a barrier for maintaining said superatmospheric pressure therein and effecting extrusion of a portion of said cooked material into atmospheric pressure for expansion of said cooked material upon emergence from said apparatus into no more than atmospheric pressure, and means for sequentially cutting said extruded material into said expanded pellets.

3. In apparatus for the manufacture of cooked and expanded extruded pellets of the character described continuously from dry pulverous cereal materials fed to said apparatus to provide in said finished pellets an expanded bulk density and internal porosity from flash expansion of steam therein upon extrusion thereof, the combination which comprises a screw feeder for receiving said dry material and continuously compacting it to form a pressure-resistant plug, counter-rotational abrading means in said screw feeder rotating counter to said screw for wearing off the internal end of said compacted plug, a cooking and conditioning container in flow communication with said screw feeder for receiving therefrom said material worn off said end of said compacted plug, means for mixing and feeding said material through said cooking and conditioning container, means for maintaining in said cooking and conditioning container at an elevated temperature and a superatmospheric steam pressure for the cooking and conditioning of material received thereby and fed therethrough, extrusion and discharge means in flow communication with said cooking and conditioning container for receiving therefrom said cereal material after having been fed therethrough and cooked and conditioned therein, said extrusion and discharge means including an end plate at the exit thereof having an extrusion die orifice therein and means for conveying said cooked material forcibly toward said end plate to form thereagainst a pressure-resistant plug of said cooked and conditioned material preventing escape of said superatmospheric pressure from said cooking container through said extrusion die orifice, and means for sequentially cutting off material extruded through said extrusion die orifice in said end plate under the action of said conveyor means after said cooked and conditioned material has expanded upon extrusion thereof into atmospheric pressure outside said apparatus by said steam contained therein to form said porous and expanded pellet extrusions.

4. In apparatus for the manufacture of cooked and expanded extruded pellets of the character described continuously from dry pulverous cereal materials fed to said apparatus to provide in said finished pellets an expanded bulk density and internal porosity from flash expansion of steam therein upon extrusion thereof, the combination which comprises a screw feeder for receiving said dry material and continuously compacting it to form a pressure-resistant plug, counter-rotational means in said screw feeder rotating counter thereto for wearing off the internal end of said plug and correlated with said compacting action of said screw feeder for maintaining said pressure-resistance of said plug, a cooking and conditioning container in flow communication with said screw feeder for receiving therefrom said material worn off said end of said compacted plug, means for mixing and feeding said material through said cooking and conditioning container, means for continuously maintaining in said cooking and conditioning container an elevated temperature and a superatmospheric steam pressure for the cooking and conditioning of material received thereby and fed therethrough, extrusion and discharge means in flow communication with said cooking and conditioning container for receiving therefrom said cereal material after having been fed therethrough and cooked and conditioned therein, said extrusion and discharge means including an end plate at the exit thereof having an extrusion die orifice therein and a screw conveyor for receiving cooked material from said cooking and conditioning container and conveying it forcibly toward said end plate to form thereagainst a pressure-resistant plug of said cooked and conditioned material preventing escape of said superatmospheric pressure in said cooking container through said extrusion die orifice, and means for sequentially cutting off material extruded through said extrusion die orifice.

5. In apparatus for the manufacture of cooked and expanded extruded pellets of the character described continuously from dry pulverous cereal materials fed to said apparatus to provide in said finished pellets an expanded bulk density and internal porosity from flash expansion of steam therein upon extrusion thereof and having a cooking container with superatomspheric pressure therein, the combination which comprises a screw feeder for receiving said dry material and continuously compacting it to form a plug at the entrance of said container preventing escape of pressure therefrom, means in said screw feeder for wearing off the end of said compacted plug for supplying material to said cooking container, means for mixing and feeding said material through said cooking container, means for maintaining in said cooking container an elevated temperature and a superatmospheric steam pressure for the cooking and conditioning of material received thereby and fed therethrough, extrusion and discharge means in flow communication with said cooking container for receiving therefrom said cereal material after having been fed therethrough and cooked therein, said extrusion and discharge means including an end plate at the exit thereof having an extrusion die orifice therein and a conveyor for receiving cooked material from said cooking container and conveying it forcibly toward and through said end plate to form thereagainst a plug for preventing escape of said superatmospheric pressure from said cooking container through said extrusion die orifice, and means for sequentially cutting off material extruded through said extrusion die orifice in said end plate under the action of said screw conveyor in said extrusion and discharge unit after cooked and conditioned material has expanded by steam pressure contained therein upon extrusion thereof into atmospheric pressure outside said apparatus to form said porous and expanded pellet extrusions.

6. In apparatus for the manufacture of cooked and expanded extruded pellets of the character described continuously from dry pulverous cereal materials fed to said apparatus to provide in said finished pellets an expanded bulk density and internal porosity from flash expansion of steam therein upon extrusion thereof and having a container therein for cooking said materials under superatmospheric pressure, the combination which comprises a screw feeder disposed at the entrance of said container for receiving said dry material and continuously compacting it to form a plug preventing pressure escape from said entrance, rotational means in said screw feeder and rotating counter to said screw feeder for wearing off the end of said compacted plug and correlated with said compacting action of said screw feeder for maintaining said pressure resistance of said plug, said cooking container being in flow communication with said screw feeder for receiving therefrom said material worn off said end of said compacted plug, means for mixing and feeding material through said cooking container, means for continuously maintaining in said cooking container an elevated temperature and a superatmospheric steam pressure for the pressure cooking of material received thereby and fed therethrough, extrusion and discharge means in flow communication with said cooking container for receiving therefrom said cereal material after having been fed therethrough and cooked therein, said extrusion and discharge means including an end plate at the exist thereof having an extrusion die orifice therein and a screw conveyor for receiving cooked material from said cooking container and conveying it forcibly toward said end plate to form thereagainst a pressure-resistant plug of said cooked material preventing escape of said superatmospheric pressure from said cooking container through said extrusion die orifice, the capacity of said screw conveyor being correlated with the extrusion capacity of said orifice effecting the maintenance of a plug of material against said end plate in excess of that which is extruded through said orifice by the action of said screw conveyor, and means for sequentially cutting off material extruded through said extrusion die orifice in said end plate under the action of said screw conveyor in said extrusion and discharge unit after cooked material has expanded upon extrusion thereof into atmospheric pressure outside said apparatus to form said porous and expanded pellet extrusions.

References Cited by the Examiner

UNITED STATES PATENTS

| | | | |
|---|---|---|---|
| 297,672 | 4/1884 | Chambers | 25—110 X |
| 1,221,594 | 4/1917 | Richman. | |
| 2,060,408 | 11/1936 | Wood | 99—237 |
| 2,116,212 | 5/1938 | Plews | 99—238 |
| 2,184,248 | 12/1939 | Bonotto. | |
| 2,321,015 | 6/1943 | Davis. | |
| 2,414,185 | 1/1947 | Andrews | 99—238.5 |
| 2,620,172 | 12/1952 | Jenett et al. | |
| 2,622,985 | 12/1952 | Haughey et al. | 99—238 X |
| 2,653,099 | 9/1953 | Carman | 99—82 |
| 2,838,401 | 6/1958 | Gates | 99—238 |
| 2,915,957 | 12/1959 | Bowman | 99—238 |
| 2,954,296 | 9/1960 | Clausi | 99—82 |

FOREIGN PATENTS 1,148,154 6/1957 France.

WALTER A. SCHEEL, *Primary Examiner.*

TOBIAS E. LEVOW, NORTON ANSHER, JEROME SCHNALL, *Examiners.*